United States Patent [19]

Zhang et al.

[11] Patent Number: 5,523,132

[45] Date of Patent: Jun. 4, 1996

[54] THIN FILM SOLAR SELECTIVE SURFACE COATING

[75] Inventors: Qi-Chu Zhang, Malabar; David Mills, Roseville; Anthony Monger, Chippendale, all of Australia

[73] Assignee: The University of Sydney, Australia

[21] Appl. No.: 263,021

[22] Filed: Jun. 20, 1994

Related U.S. Application Data

[63] Continuation of Ser. No. 916,370, Jul. 20, 1992, abandoned.

[30] Foreign Application Priority Data

Jul. 19, 1991 [AU] Australia ............................. PK7343

[51] Int. Cl.$^6$ ......................................... B32B 17/06
[52] U.S. Cl. .................... 428/34.4; 428/34.6; 428/216; 428/432; 428/433; 428/434; 428/469; 428/472; 428/552; 428/620; 428/632; 428/701; 428/702; 126/907; 126/908
[58] Field of Search ........................... 126/701, 443, 126/907, 908; 428/426, 428, 432, 433, 434, 34.4, 34.6, 469, 471, 472, 701, 702, 213, 214, 552, 548, 216, 618, 620, 632, 660

[56] References Cited

U.S. PATENT DOCUMENTS

| | | | |
|---|---|---|---|
| 3,978,272 | 8/1976 | Donley | 428/471 |
| 4,122,239 | 10/1978 | Riboulet | 126/908 |
| 4,312,915 | 1/1982 | Fan | 126/908 |
| 4,339,484 | 7/1982 | Harding | 428/34.6 |
| 4,376,801 | 3/1983 | Schardein | 126/908 |
| 4,442,166 | 4/1984 | Fan | 126/908 |
| 4,628,905 | 12/1986 | Mills | 126/908 |
| 4,777,936 | 10/1988 | Arai | 126/908 |
| 4,834,066 | 5/1989 | Collins | 126/908 |

Primary Examiner—Ellis P. Robinson
Assistant Examiner—Timothy M. Speer
Attorney, Agent, or Firm—Ostrolenk, Faber, Gerb & Soffen

[57] ABSTRACT

Solar energy absorptive coatings that comprise single cermet layers with a homogeneous metal volume fraction exhibit an absorptance of about 0.8, which is not high enough for practical solar applications. To achieve absorptance greater than 0.9, graded composite films have been developed, but they give rise to higher thermal emittance due to the absorption edge not being sharp enough. This leads to increased thermal emittance at high operating temperatures, in the range of 300° C. to 500° C. There is now disclosed a novel solar selective surface coating which is composed of two cermet layers, with different metal volume fractions in each layer. The two cermet layers have different thicknesses, and the layers have thicknesses and volume fractions such that solar radiation is absorbed by internal absorbing and phase cancellation interference, but the cermet layers are substantially transparent in the thermal infrared region.

18 Claims, 1 Drawing Sheet

THIN FILM SOLAR SELECTIVE SURFACE COATING

This application is a Continuation of Ser. No. 916,370, filed Jul. 20, 1992, now abandoned.

FIELD OF THE INVENTION

This invention relates to a thin film solar selective surface coating and to a solar collector element incorporating such coating.

BACKGROUND OF THE INVENTION

Modern solar selective surface coatings use cermets (that is, metals in dielectric matrices) as absorbers of solar energy. The cermets exhibit strong absorption peaks in the main solar radiation region whilst remaining substantially transparent in the thermal (infrared) region The cermets are deposited on a bright metal infrared reflecting base to form a selective surface coating.

Selective surfaces that incorporate cermets as solar absorbers have been used on an extensive commercial scale. The most widely used are "black chrome", a graded $Cr-Cr_2O_3$ composite produced by electroplating, and nickel-pigmented $Al_2O_3$ produced by electrolytic colouration of anodised aluminium sheet. Surfaces such as these yield a high solar absorptance between 0.92 to 0.97 and a concomitant hemispherical thermal emittance between 0.08 and 0.26. However, the emittance of such surfaces rises steeply at high temperatures, so that the surfaces normally are useful only for low temperature applications.

Most solar collector systems have taken the form of low temperature, low concentration static systems or high concentration tracking systems. For both of these collector systems, high absorptance (ie., greater than 0.9) has a higher priority than low emitrance. In order to achieve an absorptance value greater than 0.9, graded composite absorbers have been adopted, the grading being obtained by progressively increasing the metal volume fraction and hence the refractive index from the upper level to the lower level of the absorber layer.

A graded stainless steel-carbon solar selective surface produced by DC reactive magnetron sputtering has been developed commercially and has been found to exhibit an absorptance of 0.92–0.94 and emittance of 0.04–0.05 at 100° C. Also, graded $Mo-Al_2O_3$ composite films with surface roughness have been reported as exhibiting an absorptance of 0.99 and an emittance of 0.08 at 200° C.

Ungraded single cermet layers, with an isotropic metal volume fraction, deposited on a copper reflector and covered by an anti-reflection layer have been demonstrated to exhibit a normal solar absorptance of about 0.8. In particular, an absorptance of 0.87 and emittance of 0.07 has recently been reported for a 70 nm $Ni-Al_2O_3$ cermet layer with a 0.21 Ni metal volume fraction. The cermet layer was deposited on a Mo infrared reflective layer on a Ni-plated stainless steel substrate, and was coated by an outer 60 nm thick $SiO_2$ anti-reflection layer. Also, an emittance of 0.027 with an absorptance of 0.85 has been reported in respect of a Cr-SiO single cermet layer.

Thus, it has been established that, if a low solar absorptance can be tolerated, a very low emittance can be achieved by use of an ungraded single cermet layer. However, if film thickness or the metal volume fraction is increased, the absorption edge shifts toward longer wavelengths, increasing absorptance but, also, increasing emittance.

That is, surface coatings having a single thin cermet layer with an isotropic metal volume fraction have been shown to have a sharp absorption edge, but their absorptance is not high enough for practical solar applications. In contrast, graded composite films have been shown to exhibit absorptance greater than 0.9, but they exhibit higher thermal emittance as a result of the edge of absorption being not sharp enough, which leads dramatically to increased emitrance at operating temperatures in the region of 300° C. to 500° C.

The rapid rise in emitrance of graded layer coatings with temperature occurs because the thermal reradiation spectrum increasingly overlaps the spectrum of incoming solar radiation as the operating temperature of the selective absorber increases. For a high temperature selective surface, the change from low surface reflectivity in the solar spectrum to high infrared reflectivity must be as rapid as possible in order to maximise the absorptance-to-emittance ratio.

SUMMARY OF THE INVENTION

The present invention seeks to avoid the apparent dichotomy in prior art coatings that incorporate graded or isotropic cermets and is directed to a novel surface coating which incorporates multiple cermet layers having differing refractive indices. The surface coating permits absorption peaks to be located at different wavelength positions for different refractive indices, thus enabling the surface reflectance-wavelength characteristic to more closely approach the ideal of low solar spectrum reflectance and high infrared reflectance.

Broadly defined, the present invention provides a solar selective surface coating which comprises a solar energy absorptive coating deposited on at least one layer of infrared reflective metal. The absorptive coating is characterised in that it comprises at least two layers of cermet, each layer being substantially homogeneous, each layer having a refractive index which is different from the or each adjacent layer, and each layer having a thickness which is substantially transparent to infrared radiation and which provides for absorption of solar radiation by internal absorption and phase cancellation interference.

The present invention also provides a solar collector element which comprises a tube through which a heat exchange material may be passed, an envelope surrounding the tube, an evacuated space defined by the tube and the envelope, and a solar selective surface coating as above defined deposited on an outer surface of the tube.

The tube of the solar collector element may be formed from metal or glass, and when formed from an appropriate metal the outer surface of the tube may constitute the infrared reflective layer of the solar selective surface coating. That is, in certain circumstances the multi-layer solar absorptive coating may be deposited directly onto the outer surface of the collector element heat exchange tube.

PREFERRED FEATURES OF THE INVENTION

The absorptive coating may be constituted by three or more layers of cermet. However, it has been found that, whilst a two-layer structure produces a result which is significantly better than a single-layer coating, the benefits of adding third and subsequent layers are diminishingly marginal. Therefore, the invention in its preferred form has a two-layer absorptive coating.

The refractive index mismatch between the adjacent layers of the absorptive coating may be achieved by use of different dielectric materials in the respective layers and by depositing each layer with the same metal volume fraction. However, it is preferred that the dielectric material be the same in each layer and that the refractive index mismatch be achieved by depositing different metal volume fractions in adjacent layers. In the case of a two-layer absorptive coating it is most preferred that the inner layer be constituted by a low metal volume fraction cermet and that the outer layer be constituted by a high metal volume fraction cermet. Also, although the volume fractions of the metal in adjacent layers of cermet in the absorptive coating are preferably different, the multiple cermet layers of the coating preferably have the same material composition.

The thickness of each layer of cermet in the absorptive coating may be the same as the or each other layer. However, in the interest of achieving absorption over the widest possible spectral range, the thickness of each layer is preferably different from that of the or each other layer. In the case of a two-layer structure, it is preferred that the inner layer, that is, the layer which is deposited upon the infrared reflective coating, has the smaller thickness.

In a particularly preferred form of the invention, an anti-reflection surface which is composed of a transparent dielectric material which enhances solar absorption is deposited upon the absorptive coating. Materials which are suitable for use as anti-reflection layers are known in the art.

An anti-diffusion layer may be deposited between the absorptive coating and the infrared reflective layer and/or between the absorptive coating and the outer anti-reflection surface layer.

The invention will be more fully understood from the following description of a preferred embodiment of a thin film solar selective surface coating which is deposited on an all-glass tubular solar collector element. The description is provided with reference to the accompanying drawings.

DETAILED DESCRIPTION OF THE INVENTION

As illustrated, the collector element comprises an inner single-ended glass tube 10 which typically has an internal diameter in the order to 20 mm and an axial length in the order of 1000 mm. The tube 10 is located within and is end-sealed to an outer glass tube 11, and the space 12 between the two tubes is evacuated. A thin film solar selective surface coating 13 is deposited on the outer surface of the inner tube 10.

The collector element would normally be mounted within a concentrator (not shown) and be connected in fluid circuit communication with a bank of similar elements. A heat exchange fluid is channelled into the inner tube 10 by way of a manifold (not shown), and thermal energy derived by absorption of solar radiation is conducted through the wall of the inner tube 10 to effect heating of the exchange fluid.

Figure 1:
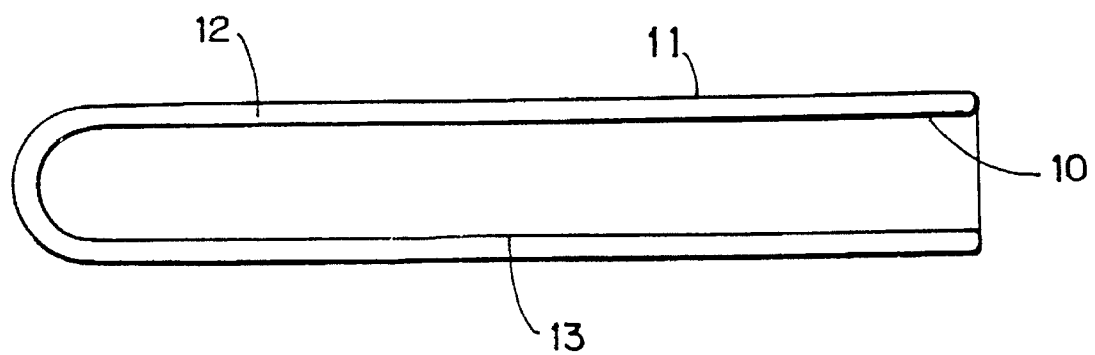
FIG. 1 shows an elevation view of a collector element.
Figure 2:
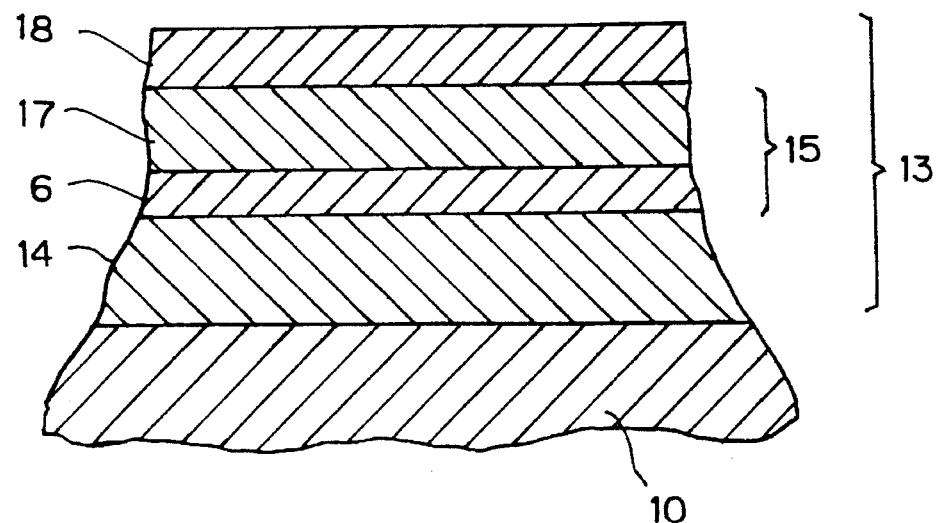
FIG. 2 shows on a very much enlarged scale a portion of the surface coating upon a part of the collector element.

The surface coating 13 is illustrated in FIG. 2 and, in its preferred form, comprises a four-layer structure. The inner layer 14 comprises an infrared reflective metal which comprises a bright metal selected from Au, Cu, Mo, Pt or Ag, with Cu being a preferred choice. The reflective layer is deposited, conveniently by a DC sputtering process or by electron beam evaporation, to a thickness in the range 100 to 400 nm and preferably to a thickness of about 300 nm. By depositing the reflective layer to such a thickness infrared reflectance is enhanced and less metallic content is required in higher cermet layers of the coating, this having the effect of reducing the emissivity of the cermet layers.

The reflective layer 14 may be deposited as two sublayers, for example as a Mo anti-diffusion layer upon a Cu base layer.

A solar energy absorptive coating 15 is deposited on the infrared reflective layer 14 as two cermet layers 16 and 17. Each cermet layer is substantially homogeneous and the material compositions of the respective layers are selected and/or proportioned such that one layer exhibits a refractive index which is different from the other. That is, the two cermet layers 16 and 17 exhibit an interfacial refractive index mismatch.

Each of the cermet layers 16 and 17 is deposited to a thickness which is substantially transparent to infrared radiation but which facilitates absorption of solar radiation by internal absorption and phase cancellation interference. Thus, each layer has a thickness within the range 20 nm to 80 nm, and one layer is desirably deposited more thinly than the other in order that the spectral range of absorptance may be increased. As illustrated, the inner layer 16 is deposited more thinly than the outer layer.

Both of the cermet layers 16 and 17 are deposited by a RF sputtering process, preferably using a co-sputtering process in order to effect deposition of the required proportions of metal and dielectric materials. Alternatively, the cermet layers may be deposited by vacuum co-evaporation of the constituents from separate sources.

The metal and dielectric constituents of each cermet layer and the relative proportions of the constituents are selected such that:

a) the layers exhibit an interfacial refractive index mismatch, b) each layer is not significantly reflective of optical radiation, and c) the layers are substantially non-degradable at temperatures to about 300° C. and, desirably, 500° C.

Cermets which have been found to be suitable in the context of the invention include:

| | |
|---|---|
| Cu—SiO | Cu—SiO$_2$ |
| Cu—Al$_2$O$_3$ | Au—Al$_2$O$_3$ |
| Ni—Al$_2$O$_3$ | Mo—Al$_2$O$_3$. |

Another suitable dielectric matrix material for the cermet is MgF$_2$ and other suitable metal components of the cermets include any one or a mixture of Au, Cu, Pt, Mo, Cr, Ag and Ni.

The cermet constituents in each of the two layers 16 and 17 would normally be the same, in order to simplify deposition procedures and to minimise interlayer diffusion but, in such case, the metal volume fraction will be different in order to achieve the desired refractive index mismatch between the layers. It is desirable that the lower metal volume fraction be present in the inner (thinner) layer 16 and that the higher metal fraction be present in the outer layer 17. The ratio of the low metal volume fraction to high metal volume fraction will be dependent upon the desired refractive index mismatch between the two cermet layers and will depend also upon any difference in the dielectric matrix material which forms a constituent of the respective cermet layers. However, the low to high metal volume fraction ratio might typically be in the order of 4:5.

An anti-reflection surface layer 18 is deposited upon the absorptive coating 15 and is constituted by a transparent dielectric material which functions to enhance solar absorption. A material which is suitable for this purpose may be selected from SiO, $SiO_2$, $Al_2O_3$, MgO and $MgF_2$, and the anti-reflection layer will be deposited to a thickness in the order of 40 nm to 70 nm.

We claim:

1. A solar selective surface coating which comprises a solar energy absorptive cermet coating deposited directly on at least one layer of infrared reflective metal, the absorptive cermet coating comprising at least two layers of cermet, each layer of cermet being substantially homogeneous and having a refractive index which is different from the or each adjacent layer, and each layer of cermet having a thickness which is substantially transparent to infrared radiation and which provides for absorption of solar radiation by internal absorption and phase cancellation interference.

2. A solar selective surface coating which comprises a solar energy absorptive cermet coating deposited directly on at least one layer of infrared reflective metal, the absorptive cermet coating comprising two layers of cermet, each layer of cermet being substantially homogeneous and having a refractive index which is different from the adjacent layer, and each layer of cermet having a thickness which is substantially transparent to infrared radiation and which provides for absorption of solar radiation by internal absorption and phase cancellation interference.

3. The surface coating as claimed in claim 2 wherein both of the cermet layers have dielectric material matrices which have the same composition and wherein one of the cermet layers has a metal volume fraction which is higher than that in the other cermet layer.

4. The surface coating as claimed in claim 3 wherein the cermet layer which lies closer to the reflective metal layer has a lower metal fraction than the other cermet layer.

5. The surface coating as claimed in claim 3 wherein the low to high metal volume fraction ratio is on the order of 4:5.

6. The surface coating as claimed in claim 2 wherein each cermet layer has a thickness in the range 20 nm to 80 nm and wherein one of the cermet layers is thicker than the other.

7. The surface coating as claimed in claim 6 wherein the cermet layer which lies closer to the reflective metal layer has a thickness which is less than that of the other cermet layer.

8. The surface coating as claimed in claim 2 wherein each cermet layer has a metal fraction which comprises a metal or a mixture of metals selected from the group consisting of Au, Cu, Pt, Mo, Cr, Ag and Ni.

9. The surface coating as claimed in claim 2 wherein each cermet layer has a dielectric material matrix selected the group consisting of from SiO, $SiO_2$, $Al_2O_3$ and $MgF_2$.

10. The surface coating as claimed in 2 wherein the reflective metal layer has a thickness in the range 100 to 400 nm and comprises a metal selected from the group consisting of Au, Cu, Mo, Pt and Ag.

11. The surface coating as claimed in claim 2 wherein a 40 to 70 nm anti-reflection surface which is composed of a transparent dielectric material selected from the group consisting of SiO, $SiO_2$, $Al_2O_3$, MgO and $MgF_2$ is deposited upon the outer one of the two cermet layers.

12. The surface coating as claimed in claim 11 wherein an anti-diffusion layer is deposited between the outer cermet layer and the anti-reflection surface layer.

13. The surface coating as claimed in claim 2 wherein each cermet layer has a metal fraction which comprises a metal or mixture of metals selected from the group consisting of Au, Cu, Pt, Mo, Cr, Ag and Ni and a dielectric material matrix selected from the group consisting of SiO, $SiO_2$, $Al_2O_3$ and $MgF_2$ and has a thickness in the range of 20 to 80 nm wherein the cermet layer which lies closer to the reflective metal layer has a lower metal fraction than the other cermet layer and wherein the reflective metal layer has a thickness in the range of 100–400 nm and comprises a metal selected from Au, Co, Mo, Pt and Ag.

14. The surface coating as claimed in claim 13 wherein the low to high metal volume fraction ratio is on the order of 4:5.

15. A solar collector element which comprises a tube through which a heat exchange material is passed, a glass envelope surrounding the tube, an evacuated space defined by the tube and the envelope, and a solar selective surface coating deposited on an outer surface of the tube; the surface coating comprising a solar energy absorptive cermet coating deposited directly on at least one layer of infrared reflected metal, the absorptive cermet coating comprising two layers of cermet, each cermet layer being substantially homogeneous and having a refractive index which is different from the other cermet layer, and each cermet layer having a thickness which is substantially transparent to infrared radiation and which provides for absorption of solar radiation by internal absorption and phase cancellation interference.

16. The solar collector element as claimed in claim 15 wherein each cermet layer has a metal fraction which comprises a metal or mixture of metals selected from the group consisting of Au, Cu, Pt, Mo, Cr, Ag and Ni and a dielectric material matrix selected from the group consisting of SiO, $SiO_2$, $Al_2O_3$ and $MgF_2$ and has a thickness in the range of 20 to 80 nm wherein the cermet layer which lies closer to the reflective metal layer has a lower metal fraction than the other cermet layer and wherein the reflective metal layer has a thickness in the range of 100–400 nm and comprises a metal selected from Au, Co, No, Pt and Ag.

17. The solar collector element as claimed in claim 16 wherein the low to high metal volume fraction ratio is on the order of 4:5.

18. A solar selective surface coating which comprises at least one layer of infrared reflective metal, an anti-diffusion layer deposited on the refractive metal layer and a solar energy absorptive cermet coating deposited directly on the anti-diffusion layer, whereby the anti-diffusion layer is positioned between the refractive metal layer and the absorptive cermet coating, the absorptive cermet coating comprising two layers of cermet, each layer of cermet being substantially homogenous and having a refractive index which is different from the adjacent layer, and each layer of cermet having a thickness which is substantially transparent to infrared radiation and which provides for absorption of solar radiation by internal absorption and phase cancellation interference.

* * * * *